United States Patent [19]

Kato

[11] 4,382,269

[45] May 3, 1983

[54] MAGNETIC HEAD

[75] Inventor: Minoru Kato, Chichibu, Japan

[73] Assignees: Canon Kabushiki Kaisha, Tokyo; Canon Denshi Kabushiki Kaisha, Saitama, both of Japan

[21] Appl. No.: 225,343

[22] Filed: Jan. 15, 1981

[30] Foreign Application Priority Data

Jan. 29, 1980 [JP] Japan .............................. 55-9239[U]

[51] Int. Cl.³ .......................... G11B 5/27; G11B 5/20; G11B 5/22
[52] U.S. Cl. .................................. 360/121; 360/122; 360/123; 360/125
[58] Field of Search ............... 360/121, 122, 123, 125, 360/127–128, 129, 118

[56] References Cited

U.S. PATENT DOCUMENTS

| 3,178,519 | 4/1965 | Blumenthal | 360/123 |
| 3,639,698 | 2/1972 | Uemura et al. | 360/121 |
| 3,812,536 | 5/1974 | Linke | 360/121 |
| 3,827,083 | 7/1974 | Hosaka et al. | 360/121 |
| 3,900,895 | 8/1975 | Girdner et al. | 360/121 |
| 4,137,555 | 1/1979 | Sveceny | 360/121 |
| 4,176,384 | 11/1979 | Yang | 360/121 |

Primary Examiner—Alfred H. Eddleman
Attorney, Agent, or Firm—Fitzpatrick, Cella, Harper & Scinto

[57] ABSTRACT

The magnetic head of the present invention has plural core members in abutting relation to form a magnetic circuit in which one of the core members is notched deeper than the other to suppress the saturation and leakage of magnetic flux, and in which one of the core members is notched deeper than the lateral end of the coil facing the magnetic tape and even with the approximate center of the coil to reduce the distortion.

18 Claims, 12 Drawing Figures

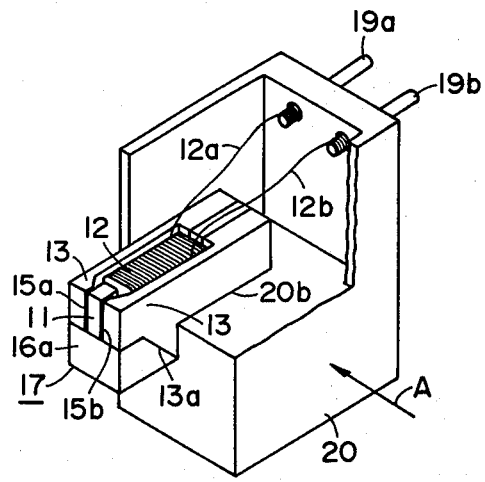
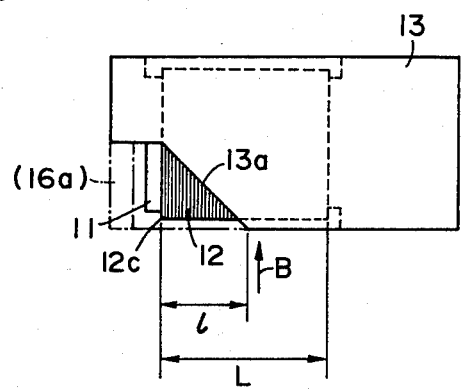
FIG. 2A  FIG. 2B
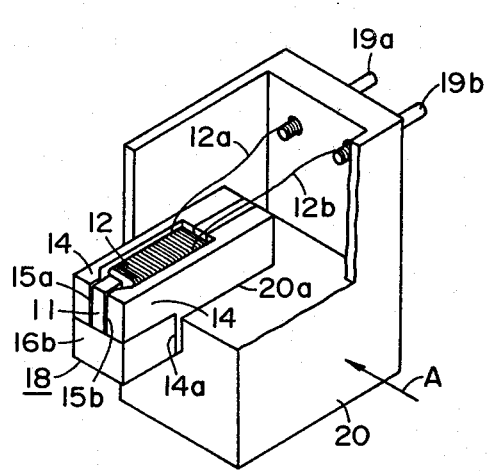
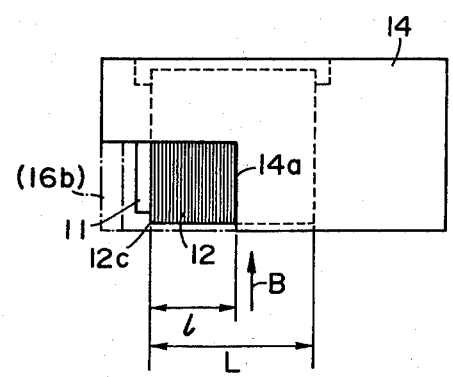
FIG. 3A  FIG. 3B

MAGNETIC HEAD

BACKGROUND OF THE INVENTION

1. Field of the Invention

The present invention relates to a magnetic head in which one of mutually abutting core members is notched deeper than the other.

2. Description of the Prior Art

The so-called Philips-type tape cassette is provided with three larger apertures principally for receiving magnetic heads or pinch roller and two smaller apertures for receiving sensors or the like. However, in recent highly advanced tape recorders for example having dual capstans and automatic reversing functions, the erasing magnetic head has to be inserted into one of said smaller apertures. For this reason a magnetic head having a protruding structure in the tape contacting portion has been employed. FIG. 1A shows, in a perspective view, the interior of a conventional erasing magnetic head utilizing the aforementioned smaller aperture in which a head element 7, composed of a center core member 1, a coil 2 side core members 3, 4 (forming magnetic gaps 5a, 5b) and a block 6 are mounted on a holder 10 having terminals 9a, 9b to which the wires 8a, 8b of said coil 2 are connected.

FIG. 1B is a lateral view of the head element 7 seen from the direction of arrow A in FIG. 1A, while FIG. 1C is a plan view of said element seen from the direction of arrow B in FIG. 1A. The head element 7 has to be extremely compact in order to be insertable into the smaller aperture of the cassette, so that the lateral dimension W of the protruding core has to be limited as shown in FIG. 1A, with the reduced cross sections of the center core member 1 and the side core members, 3, 4. Such reduced cross sections of the core members result in a magnetic saturation of the magnetic circuit composed of said core members when a large current is applied to the coil 2.

For this reason, in the conventional magnetic head, the core height T2 is selected larger than the track width T1 to enlarge the cross section of the magnetic circuit, and the tape contacting portion of the center core member 1 and the core members 3, 4 are partially notched to meet the track width, the notch 6a being filled with the block 6 which is plate-shaped and non-magnetic. However the structure shown in FIGS. 1A to 1C is still defective in giving rise to saturation of magnetic circuit and leaking magnetic flux between the core members when the flux density around the magnetic gaps is elevated, thus leading to an elevated distortion as explained afterwards.

SUMMARY OF THE INVENTION

A first object of the present invention is to provide a magnetic head capable of reducing the saturation and leak of magnetic flux in the vicinity of the tape contacting portion of the magnetic circuit, and a second object of the present invention is to provide a magnetic head capable of further reducing distortion.

BRIEF DESCRIPTION OF THE DRAWINGS

FIG. 2A is a perspective view of a first embodiment of the magnetic head of the present invention;

FIG. 2B is a lateral view of the head element shown in FIG. 2A;

FIG. 3A is a perspective view of a second embodiment of the magnetic head of the present invention;

FIG. 3B is a lateral view of the head element shown in FIG. 3A;

DETAILED DESCRIPTION OF THE PREFERRED EMBODIMENTS

Figure 1A:
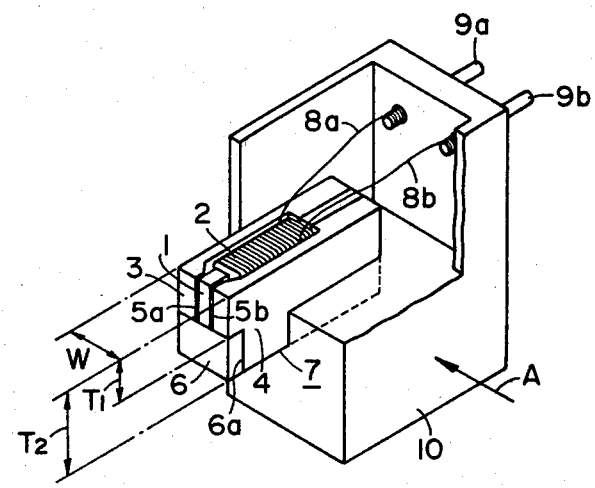
FIG. 1A is a perspective view of a conventional magnetic head.

Now the present invention will be explained in detail by the preferred embodiments thereof shown in the attached drawings. FIG. 2A shows a first embodiment of the magnetic head of the present invention in perspective view, while FIG. 2B shows, in lateral view seen from the direction of arrow A, a head element 17 of the magnetic head shown in FIG. 2A from which a holder 20 and a block 16a are removed for clarity. Also FIG. 3A shows a second embodiment of the present invention in perspective view, while FIG. 3B shows, in lateral view seen from the direction of arrow A, a head element 18 of the magnetic head shown in FIG. 3A from which a holder 20 and a block 16b are removed for clarity. Also FIG. 4 is a plan view of one head element 17 or 18 shown in FIG. 2B or 3B, when seen from the direction of arrow B, both appearing the same in plan view.

In FIGS. 2A and 3A, a center core member 11 of a material of high magnetic permeability, such as a sendust or a ferrite, is provided with a coil 12 and positioned in abutting relation at a rear portion thereof with side core members 13(FIG. 2) or 14(FIG. 3) of a material of high magnetic permeability to form a magnetic gap or gaps 15a and/or 15b at the forward portions thereof which are maintained in sliding contact with an unrepresented magnetic tape to erase the information recorded thereon. Said side core members 13 or 14 are provided with notches 13a so structured that the dimension of said members in the track width direction is gradually changed from T1 to T2 in FIG. 1A in the depth direction of the notches, or notches 14a which are shaped as but deeper than the notches 6a shown in FIG. 1A. The notches are filled with a non-magnetic block 16a or 16b. The aforementioned center core member 11, coil 12, side core members 13(or 14) and block 16a(or 16b) are assembled as a head element 17(or 18) which is partially supported in a recess 20b or 20a of a holder 20 having terminals 19a, 19b so as to constitute a protruding portion toward the unrepresented magnetic tape. The wires 12a, 12b of the coil 12 are connected, for example by soldering, to said terminals 19a, 19b. The magnetic head thus structured can be maintained in sliding contact with the magnetic tape by inserting said protruding portion into a smaller aperture of the tape cassette.

Figure 4:
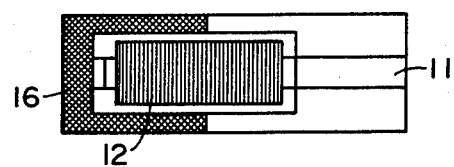
FIG. 4 is a plan view of the head element shown in FIGS. 2B and 3B.

FIG. 4 shows the head element of FIG. 2B or 3B in a bottom plan view seen from the direction of arrow B, wherein the aforementioned block 16a or 16b appears in a hatched square-U area.

Figure 1B:
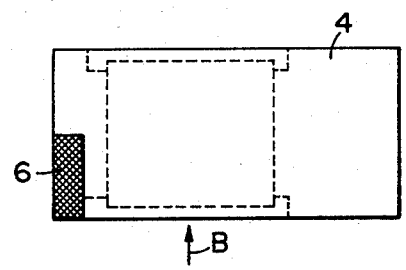
FIG. 1B is a lateral view of the head element shown in FIG. 1A.
Figure 1C:
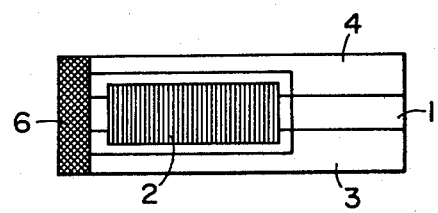
FIG. 1C is a plan view of the head element shown in FIG. 1B.
Figure 5A:
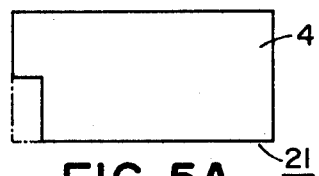
FIGS. 5A to 5C are lateral views of the head element.
Figure 5B:
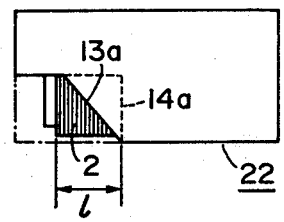
Figure 5C:
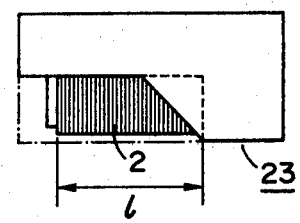

FIGS. 5A to 5C show the head elements in lateral views, wherein FIG. 5A shows the head element of a conventional magnetic head as shown in FIG. 1B, and FIG. 5B shows the head element of the first embodiment having the full-lined notches 13a or of the second embodiment having the broken-lined notches 14a, respectively shown in FIG. 2B or 3B. Assuming the length of coil 12 is L and the length of the notch measured from the tape contacting end 12c of the coil 12 is l, the embodiment shown in FIG. 5B satisfies a condition $l \leq L/2$ (including the approximate center of the coil) while that shown in FIG. 5C satisfies a condition $l > L/2$.

Figure 6:
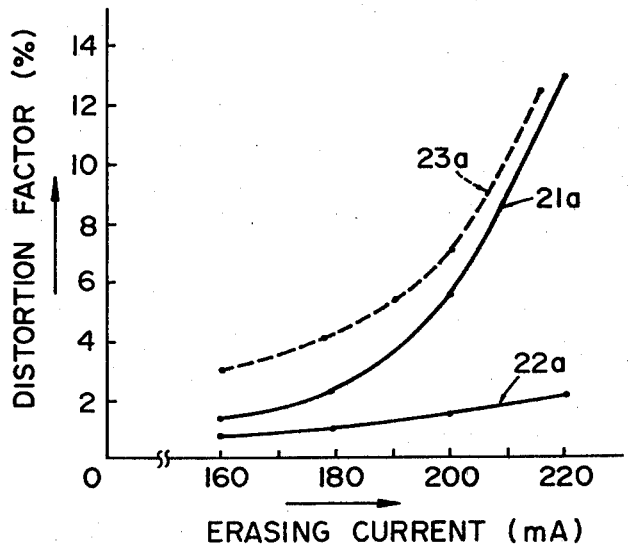
FIG. 6 is a chart showing the comparison of distortion characteristics of the magnetic heads.

FIG. 6 is a chart showing the distortion factor of the head elements 21 to 23 shown in FIGS. 5A to 5C, wherein the distortion factor of the head element 22, satisfying the condition $l \leq L/2$ as shown in FIG. 5B, is represented by a curve 22a, and displays a lower distortion factor than the conventional head element 21 shown in FIG. 5A the distortion factor of which is represented by a curve 21a or the head element 23 shown in FIG. 5C the distortion factor of which is represented by a curve 23a.

As explained in the foregoing, the present invention reduces the saturation in the magnetic circuit and the leaking magnetic flux between the core members and reduces the distortion merely be changing the shape of the side core members and all without affecting the manufacturing cost of the magnetic head.

What I claim is:

1. A magnetic head comprising:
 a first magnetic core made of material having high magnetic permeability and providing a first sliding surface for a tape;
 a coil wound on said first magnetic core; and
 at least one second magnetic core mounted adjacent said first core and made of material having high magnetic permeability, said second core being formed with a protrusion providing a second sliding surface for a tape, which defines a common sliding tape surface with said first sliding surface provided by said first core, and a stepped recess extending from said protrusion to a terminal region, one end of said coil wound on said first core being intermediate said sliding surfaces and said terminal region.

2. A magnetic head according to claim 1, wherein said terminal region of said recess is located no farther from said one end of said coil than the axial distance from said one end to the center of said coil.

3. A magnetic head according to claim 2, wherein at least a portion of the surface defining said recess extends parallel to said sliding surfaces.

4. A magnetic head according to claim 2, wherein at least a portion of the surface defining said recess is slanted with respect to said sliding surfaces.

5. A magnetic head according to claim 1, wherein a void defined by said stepped recess and said protrusion in said second core is filled with a non-magnetic block.

6. A magnetic head comprising:
 a first magnetic core made of material having high magnetic permeability and formed with a stepped protrusion defining a first sliding surface for a tape;
 a coil wound on said first magnetic core; and
 at least one second magnetic core mounted adjacent said first core and made of material having high magnetic permeability, said second core being formed with a stepped protrusion defining a second sliding surface for a tape, which defines a common sliding tape surface with said first sliding surface defined by said first core, and a stepped recess extending from said second sliding surface to a terminal region, one end of said coil wound on said first core being intermediate said sliding surface and said terminal region.

7. A magnetic head according to claim 6, wherein said terminal region of said recess is located no farther from said one end of said coil than the axial distance from said one end to the center of said coil.

8. A magnetic head according to claim 7, wherein at least a portion of the surface defining said recess extends parallel to said sliding surfaces.

9. A magnetic head according to claim 7, wherein at least a portion of the surface defining said recess is slanted with respect to said sliding surfaces.

10. A magnetic head according to claim 6, wherein a void defined by said protrusion on said first core and said stepped protrusion and said recess on said second core is filled with a non-magnetic block.

11. A magnetic head comprising:
 a first magnetic core made of material having high magnetic permeability and formed with a stepped protrusion defining a first sliding surface for a tape;
 a coil wound on said first magnetic core;
 a plurality of second magnetic cores each mounted adjacent a different side of said first core and made of a material having high magnetic permeability, each of said second cores being formed with a stepped protrusion defining a second sliding surface for a tape, which defines a common sliding tape surface with said first sliding surface defined by said first core, and a stepped recess extending from said second sliding surface to a terminal region, one end of said coil wound on said first core being intermediate said sliding surfaces and said terminal regions; and
 a block made of non-magnetic material defining a U-shaped face and filling a void defined by said protrusion on said first core and said stepped protrusions and said recesses on said second cores.

12. A magnetic head according to claim 11, wherein said terminal regions of said recesses are located no farther from said one end of said coil than the axial distance from said one end to the center of said coil.

13. A magnetic head according to claim 12, wherein at least a portion of the surface defining each of said recesses extends parallel to said sliding surfaces.

14. A magnetic head according to claim 12, wherein at least a portion of the surface defining each of said recesses is slanted with respect to said sliding surfaces.

15. A magnetic head comprising:
 a first magnetic core of material having high magnetic permeability and formed with a stepped protrusion defining a first sliding surface for a tape and a recess extending from said first sliding surface to a first terminal region; and
 at least one second magnetic core mounted adjacent said first core and made of material having high magnetic permeability, said second core being formed with a stepped protrusion defining a second sliding surface for a tape, which defines a common sliding tape surface with said first sliding surface defined by said first core, and a stepped recess extending from said second sliding surface to a second terminal region, said first terminal region being intermediate said sliding surfaces and said second terminal region.

16. A magnetic head according to claim 15, wherein a void defined by said stepped protrusion on said first core and said protrusion and said recess on said second core is filled with a non-magnetic block.

17. A magnetic head comprising:
a first magnetic core made of material having high magnetic permeability and formed with a sliding surface for a tape;
a coil wound on said first core; and
a pair of second magnetic cores each mounted adjacent said first core and made of material having high magnetic permeability, each of said second cores being formed with a recess therein, permitting a side face of said core to be exposed through each of said second cores.

18. A magnetic head according to claim 17, wherein a void defined at least in part by said recesses is filled with a non-magnetic block.

* * * * *